No. 11,830. Reissued June 12, 1900.
L. C. BAILEY.
FOLDING BED.
(Application filed Mar. 5, 1900.)
2 Sheets—Sheet 1.
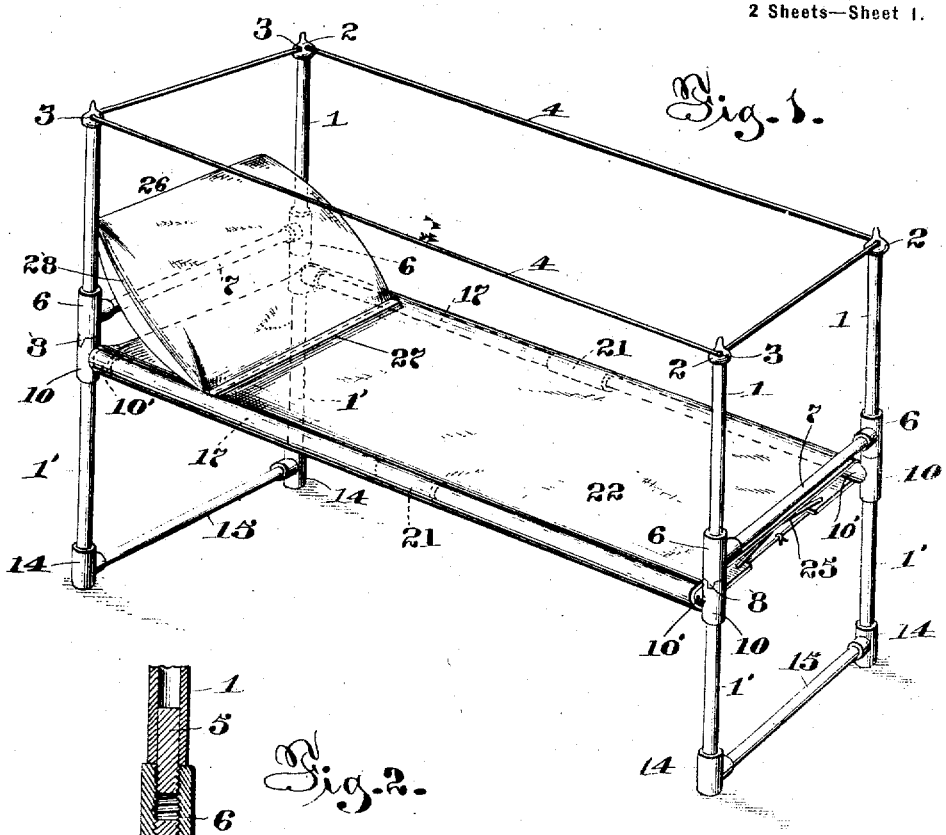
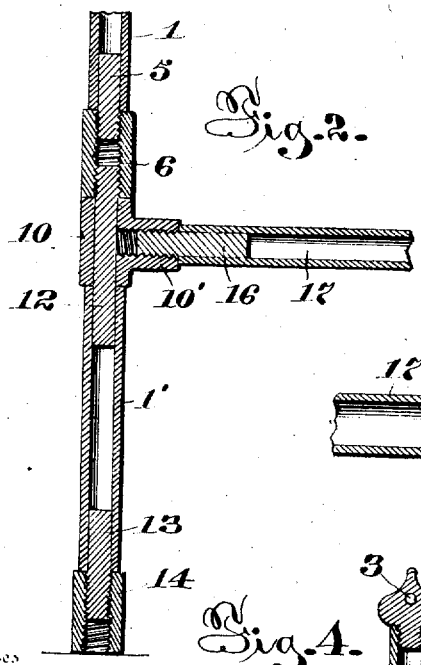
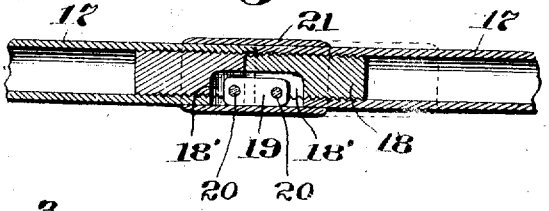
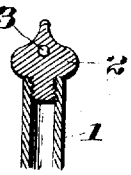
Witnesses
Marcus L. Byng.
Esther V. Byng
Inventor
Leonard C. Bailey
by
Mason Fenwick & Lawrence
his Attorney No. 11,830. Reissued June 12, 1900.
L. C. BAILEY.
FOLDING BED.
(Application filed Mar. 5, 1900.)
2 Sheets—Sheet 2.
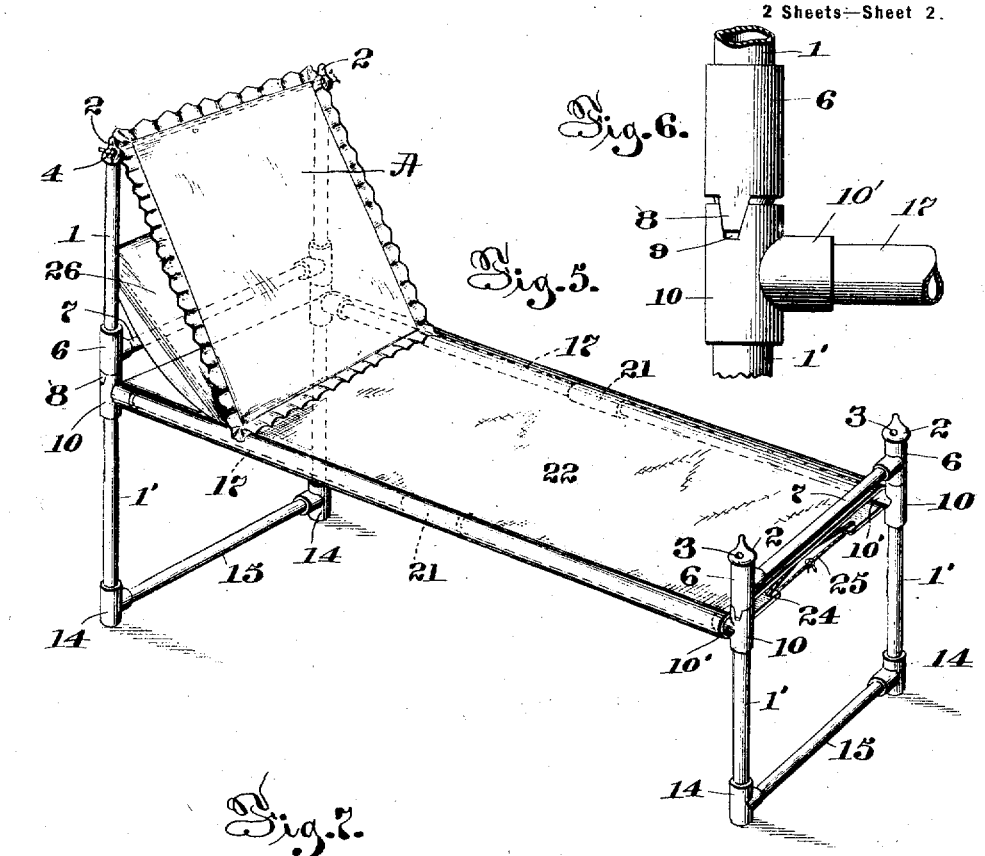
Witnesses
Marcus L. Byng
Esther V. Byng
Inventor
Leonard C. Bailey
by Wm. Frederick Hamm
his Attorney

BEST AVAILABLE COPY

UNITED STATES PATENT OFFICE.

LEONARD C. BAILEY, OF WASHINGTON, DISTRICT OF COLUMBIA.

FOLDING BED.

SPECIFICATION forming part of Reissued Letters Patent No. 11,830, dated June 12, 1900.

Original No. 629,286, dated July 18, 1899. Application for reissue filed March 5, 1900. Serial No. 7,418.

*To all whom it may concern.*

Be it known that I, LEONARD C. BAILEY, a citizen of the United States, residing at Washington, in the District of Columbia, have invented certain new and useful Improvements in Folding Beds; and I do declare the following to be a full, clear, and exact description of the invention, such as will enable others skilled in the art to which it appertains to make and use the same.

My invention relates to a portable folding or collapsible bed; and the object is to provide a simple, inexpensive, convenient, and durable article of this character.

With this object in view the invention consists in a folding or collapsible bed comprising the improved construction, arrangement, and combination of parts hereinafter described and afterward specifically claimed.

In the accompanying drawings the same reference characters indicate the same parts of the device.

Figure 1 is a perspective view of a folding bed embodying my invention. Fig. 2 is a detail section of one of the counterpart head and foot posts and the contiguous end of the side rail. Fig. 3 is a longitudinal section of one of the side rails to show the hinge-joint. Fig. 4 is a detail section of the upper end of one of the head-posts, showing the removable acorn ornament. Fig. 5 is a perspective view showing another manner of assembling the bed. Fig. 6 is a detail view of one of the lock-joints connecting the side rails and the foot and head posts. Fig. 7 is a bottom plan view of the bed-bottom. Fig. 8 is a transverse section of the same, and Fig. 9 is a transverse section of the modified form of bed-bottom.

1 1 denote the upper sections of the counterpart head and foot posts, and each consists of a piece of comparatively-thin steel tubing, the upper end of which is internally threaded to receive the detachable acorn knob 2, which is formed with a transverse orifice 3 to receive the canopy-cord 4.

The lower end of each post-section 1 1 has brazed in it a projecting threaded plug or stud 5, which engages the T-couplings 6 6, which are connected by a cross-brace 7, and the lower ends of these couplings 6 are provided with a longitudinal tapering tooth or tongue 8, which engages a corresponding recess 9 in the abutting edge of a similar plug or T-coupling 10, which encompasses the threadless shank of a plug or stud-bolt 12, brazed in the lower head-post section 1, the projecting end of the stud-bolt 12 having a threaded engagement with the contiguous end of the coupling 6. The tongue 8 does not bottom in the recess 9, so that when screwed together the tongue is wedged in the recess and a rigid joint is attained which prevents any tendency to "wabbling" or lateral movement, and this construction also provides for wear, which can only take place on the sides of the tongue and recess, and such wear is fully compensated for by allowing the abutting ends to come closer together.

The lower ends of the tubular sections 1′ 1′ are each provided with a brazed stud 13, the projecting ends of which have a threaded engagement with the T-couplings 14 14, which in turn have threaded engagements with the tubular cross-brace 15. The lateral sockets 10′ of the T-couplings 10 also have a threaded engagement with the stud-bolt 16, brazed in the contiguous ends of the side rails 17 17, which are divided transversely about midway of their length. These meeting ends are internally threaded to receive the externally-threaded counterpart sockets 18 18, the meeting ends of which are formed with alined longitudinal recesses 18′ to receive the bar 19, which is pivoted in the abutting ends of the sockets by the rivets 20 20. It will be noted that the outer end of one of the sockets is sunken below the end of its encompassing tube, while the meeting end of the other projects a corresponding distance beyond the end of its tube, and when the parts are alined, as shown in Fig. 6, the projecting end of the one socket extends into the recess in the opposite tube, formed by depressing the end of the contiguous socket, as heretofore described, to assist in forming a rigid joint when the two sections are alined.

21 denotes a sleeve snugly encompassing and having a sliding engagement with the side rails and when slid over the joint gives additional rigidity to the rail at this point, and, as shown in dotted lines in Fig. 6, this sleeve may be slid clear off the joint to permit the two sections to be folded parallel with each other. The outer ends of this sleeve are chamfered, as shown, to facilitate its insertion in the hem 22 of the canvas bed-bottom 23, as shown in Fig. 9.

In Figs. 1 and 5 the bottom laps over or around the side rails, and its parallel edges are provided with eyelets 24 and a lacing-cord 25, as shown in Figs. 7 and 8, to give the proper tension to the fabric comprising the bottom.

26 denotes the pillow-case, having its lower edge 27 stitched to the bed-bottom, and one of its end edges 28 is left open to stuff the pillow and remove the filling when the bottom and pillow are washed.

In Fig. 5 I have shown the upper sections 1 1 of the foot-posts removed and the knobs 2 2 fitted in the couplings 6 6, which arrangement, together with the pillow-sham A supported from the canopy-cord between the head-posts, presents a neat and attractive form of bed for household use.

While my improved bed is primarily intended for hospital use on account of its hygienic properties and the facility with which it can be kept clean and rendered antiseptic, its uses under other conditions are manifold from convenience with which it can be packed in a small compass for transportation or storage and the facility with which it can be assembled in an emergency.

It will be obvious to those skilled in the art that many changes and variations in the details of construction as herein shown and described might be made without departing from the spirit of my invention.

Having thus fully described my invention, what I claim as new and useful, and desire to secure by Letters Patent of the United States, is—

1. In a folding bed, the side rails divided transversely, slotted sockets fitted in the meeting ends of said rails, a pivoted bar connecting the abutting ends of said sockets, and a chamfered sleeve having a sliding engagement with said divided rails, substantially as shown and described.

2. In a folding bed, the side rails divided transversely, slotted sockets fitted in the contiguous ends of said rails, one of said sockets extending beyond the end of its rail and the other depressed within its rail to form a pocket for the projecting end of the opposite socket, a bar pivotally connecting said sockets, and a sleeve having a sliding engagement with said rails, substantially as shown and described.

3. In a folding bed, a bed-post comprising an upper and lower section, a screw-threaded plug secured to the upper section and a screw-threaded plug secured to the lower section and provided intermediate its ends with a smooth portion, a screw-threaded sleeve connecting the screw-threaded ends of said plugs, and a sleeve mounted on the smooth portion of the plug, said sleeves having an interlocking non-rotatable connection, substantially as and for the purpose set forth.

4. In a folding bed, a tubular bed-post comprising an upper and a lower section, a screw-threaded plug in the upper end of the lower section, a screw-threaded plug in the lower end of the upper section, a sleeve mounted on the plug of the lower section, and a screw-threaded sleeve connecting the ends of the two screw-threaded plugs, substantially as described.

5. A folding or collapsible bed, embodying in its construction a leg, a side rail and a cross-brace, said rail and brace being each provided with an end fitting or sleeve, the sleeves of the brace and rail being disconnectedly arranged one above and resting upon the other, the leg extending upwardly through the lower of said sleeves into and terminating in the upper sleeve in which it is secured, and means for supporting the lower sleeve, substantially as described.

6. A folding or collapsible bed embodying in its construction a leg, a side rail and a cross-brace, said rail and brace being each provided with an end fitting or sleeve, the sleeves of said brace and rail being disconnectedly arranged one above and resting upon the other, and the lower sleeve being smooth-bored, the leg extending upwardly through said lower sleeve into and terminating in the upper sleeve, in which it is secured, and means for supporting the lower sleeve, substantially as described.

7. A folding or collapsible bed embodying in its construction a leg and a side rail and cross-brace, said rail and brace being each provided with an end fitting or sleeve, the sleeves of said brace and rail being disconnectedly arranged one above and resting upon the other, the upper sleeve being screw-threaded, the leg extending upwardly through the lower of said sleeves into and terminating in the upper sleeve, into which it is threaded, substantially as described.

8. A folding or collapsible bed embodying in its construction a leg, a side rail and a cross-brace, said rail and brace being each provided with an end fitting or sleeve, the sleeves being disconnectedly arranged one above and resting on the other, and the lower sleeve being smooth-bored, the leg being provided with a smooth portion intermediate its ends upon which the lower sleeve is mounted, and the upper end of the leg projecting above said lower sleeve into and terminating in the upper sleeve into which it is secured, and means for supporting the lower sleeve, substantially as described.

9. A folding or collapsible bed embodying in its construction a leg composed of an upper and lower section, and a side rail and cross-brace, each provided with an end fitting or sleeve, said sleeves being disconnectedly arranged one above and resting upon the other, the lower leg-section extending through the lower sleeve and secured in the upper sleeve and the upper leg-section being secured in the upper end of the upper sleeve, substantially as described.

10. A folding or collapsible bed embodying in its construction a leg composed of an upper and a lower section, and a side rail and cross-brace, each provided with an end fitting or sleeve, said sleeves being disconnectedly arranged one above and resting upon the other, the upper sleeve being interiorly screw-threaded, the lower leg-section extending through the lower sleeve and threaded into the upper sleeve, and the upper leg-section being threaded into the upper end of the upper sleeve, substantially as described.

11. A folding or collapsible bed embodying in its construction a leg composed of an upper and a lower section, and a side rail and cross-brace each provided with an end fitting or sleeve, said sleeves being disconnectedly arranged one above and resting upon the other, the lower sleeve being smooth-bored, the lower section of the leg being provided with a smooth portion intermediate its ends upon which the lower sleeve is mounted, the upper end of said lower leg-section extending through the lower sleeve and secured in the upper sleeve, and the upper leg-section being secured in the upper end of the upper sleeve, substantially as described.

12. A folding or collapsible bed embodying in its construction a leg composed of an upper and a lower section, and a side rail and cross-brace each provided with an end fitting or sleeve, said sleeves being disconnectedly arranged one above and resting upon the other, the upper sleeve being interiorly threaded and the lower sleeve smooth-bored, the lower section of the leg being provided with a smooth portion intermediate its ends upon which the lower sleeve is mounted, the upper end of said lower leg-section extending through the lower sleeve and threaded into the upper sleeve, and the upper leg-section being threaded into the upper end of the upper sleeve, substantially as described.

L. C. BAILEY.

Witnesses:
E. T. FENWICK,
D. B. MCCARY.